United States Patent
Vandergrift et al.

(10) Patent No.: US 11,329,539 B2
(45) Date of Patent: May 10, 2022

(54) CONTROLLER FOR A GENERATOR

(71) Applicant: Hamilton Sundstrand Corporation, Charlotte, NC (US)

(72) Inventors: Adrian E. Vandergrift, Rockton, IL (US); Thomas P. Joyce, Rockford, IL (US); Jordan K. Vanevenhoven, Rockford, IL (US); Natalie Filipski, Saint Charles, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 149 days.

(21) Appl. No.: 16/815,199

(22) Filed: Mar. 11, 2020

(65) Prior Publication Data

US 2021/0288567 A1 Sep. 16, 2021

(51) Int. Cl.
 *H02P 1/46* (2006.01)
 *H02K 19/36* (2006.01)
 *H02K 19/12* (2006.01)

(52) U.S. Cl.
 CPC ............. *H02K 19/36* (2013.01); *H02K 19/12* (2013.01); *H02P 2201/03* (2013.01); *H02P 2207/05* (2013.01)

(58) Field of Classification Search
 CPC .... H02K 19/36; H02K 19/12; H02P 2201/03; H02P 2207/05; H02P 9/10; H02P 9/48
 See application file for complete search history.

(56) References Cited

U.S. PATENT DOCUMENTS

| | | | |
|---|---|---|---|
| 5,194,801 A | 3/1993 | Rozman | |
| 5,594,322 A | 1/1997 | Rozman et al. | |
| 6,850,043 B1 | 2/2005 | Maddali | |
| 7,821,145 B2 | 10/2010 | Huang et al. | |
| 8,378,641 B2 | 2/2013 | Rozman et al. | |
| 8,378,644 B2 | 2/2013 | Said et al. | |
| 9,252,695 B2 | 2/2016 | Benya, Jr. et al. | |
| 9,634,595 B2 | 4/2017 | Safari-Zadeh et al. | |
| 9,660,563 B2 | 5/2017 | Rozman et al. | |
| 9,979,336 B2 | 5/2018 | Namuduri et al. | |
| 10,128,785 B1 | 11/2018 | Stitt et al. | |
| 10,196,921 B2 | 2/2019 | Gatzen et al. | |
| 2004/0108726 A1 | 6/2004 | Sarlioglu et al. | |

(Continued)

FOREIGN PATENT DOCUMENTS

| | | |
|---|---|---|
| DE | 102017119743 A1 | 2/2019 |
| EP | 3657715 A1 | 11/2019 |
| WO | 2016133503 A1 | 8/2016 |

OTHER PUBLICATIONS

European Search Report issued in European Application No. 21162042.2; Application Filing Date Mar. 11, 2021; dated Aug. 3, 2021 (8 pages).

*Primary Examiner* — Karen Masih
(74) *Attorney, Agent, or Firm* — Cantor Colburn LLP

(57) ABSTRACT

A system including a generator and a controller. The generator includes a permanent magnet generator (PMG), and an exciter. The controller manages operations of the generator. The controller includes an alternating current to direct current (AC-to-DC) converter that generates a direct current (DC) voltage, an exciter drive that provides a DC current to the exciter of the generator using the DC voltage created by the AC-to-DC converter in accordance with the control signal, and a regulator controller that drives the active AC-to-DC converter.

20 Claims, 2 Drawing Sheets

(56) References Cited

U.S. PATENT DOCUMENTS

| | | |
|---|---|---|
| 2009/0295314 A1 | 12/2009 | Ganev et al. |
| 2013/0016546 A1 | 1/2013 | Mountain |
| 2015/0263658 A1* | 9/2015 | Benya, Jr. ............... H02P 9/302 |
| | | 322/46 |
| 2020/0350842 A1 | 11/2020 | Rosso et al. |

* cited by examiner

CONTROLLER FOR A GENERATOR

BACKGROUND

Exemplary embodiments pertain to a controller for a generator.

In general, an integrated drive generator or variable frequency generator includes three stages, such as a permanent magnet generator (PMG) stage, an exciter stage, and a main stage. The integrated drive generator or variable frequency generator is controlled by a generator control unit (GCU), which rectifies an output of the PMG stage by a diode bridge of the GCU. The diode bridge converts the PMG's alternating current (AC) input into the DC link voltage, which is the rectified direct current (DC) output that is used by an exciter drive of the GCU to provide excitation current to the exciter stage of the integrated drive generator or variable frequency generator. Voltage on the DC link varies significantly due to one or more factors, such as a PMG input voltage that varies with engine speed, an exciter load current, and an exciter flyback energy during protective trips (e.g., when exciter current flows back into a DC link capacitor and causes a transient overvoltage). The technical drawbacks of this varying voltage include electrical overstress and/or constrained designs that require electronics rated for very high voltage. Further, the DC link variation can also cause variation in a response time of a generator output voltage control loop.

Moreover, variable frequency generation systems (e.g., a variable frequency generator) result in a wide input voltage range for the exciter drive of the GCU and/or an internal high voltage (HV) to 28 voltage (V) converter. In this regard, both need to deal with the wide input voltage range. For the exciter drive, at lower voltages, the exciter itself requires higher exciter current, while the exciter drive has less ability (e.g., due to lower flyback voltage) to get energy out of the exciter. For the internal HV to 28V converter, the wide voltage input range limits topologies available and results in a more expensive, complex designs.

BRIEF DESCRIPTION

In accordance with one or more embodiments, a system including a generator and a controller is provided. The generator includes a permanent magnet generator (PMG), and an exciter. The controller manages operations of the generator. The controller includes an alternating current to direct current (AC-to-DC) converter that generates a direct current (DC) voltage, an exciter drive that provides a DC current to the exciter of the generator using the DC voltage created by the AC-to-DC converter in accordance with the control signal, and a regulator controller that drives the active AC-to-DC converter.

In accordance with one or more embodiments or the system embodiment above, the AC-to-DC converter can include an AC-to-DC link regulator.

In accordance with one or more embodiments or any of the system embodiments above, the AC-to-DC link regulator can rectify an AC voltage received from the PMG into a DC link of the controller.

In accordance with one or more embodiments or any of the system embodiments above, the regulator controller can include a DC regulator controller.

In accordance with one or more embodiments or any of the system embodiments above, the DC regulator controller can generate and provide a control signal to drive the AC-to-DC converter.

In accordance with one or more embodiments or any of the system embodiments above, the DC regulator controller can receive one or more feedback signals from a DC link of the controller and can manage the control signal in accordance with the one or more feedback signals.

In accordance with one or more embodiments or any of the system embodiments above, the DC voltage can be generated as constant.

In accordance with one or more embodiments or any of the system embodiments above, the controller can include an exciter drive controller that receives and utilizes one or more feedback signals from a main output of the generator to provide a pulse width modulation (PWM) control signal to the exciter drive, and the exciter drive can provide the DC current to the exciter from the DC voltage based on the PWM control signal.

In accordance with one or more embodiments or any of the system embodiments above, the AC-to-DC converter can include a boost converter.

In accordance with one or more embodiments or any of the system embodiments above, the regulator controller can include a boost converter controller.

In accordance with one or more embodiments or any of the system embodiments above, the boost converter and the boost converter controller of the controller can convert 3-Phase PMG to a fixed high voltage for use in driving the exciter.

In accordance with one or more embodiments, a method implemented by a controller managing operations of a generator is provided. The method includes generating a control signal by a regulator of the controller and providing the control signal by the regulator to an alternating current to direct current (AC-to-DC) converter of the controller. The method also include driving, by the control signal, the AC-to-DC converter to generate a direct current (DC) voltage and providing a DC current to an exciter of the generator using the DC voltage created by the AC-to-DC converter in accordance with the control signal.

In accordance with one or more embodiments or the method embodiment above, the AC-to-DC converter can include an AC-to-DC link regulator, the AC-to-DC link regulator rectifying an AC voltage received from a permanent magnet generator (PMG) of the generator into a DC link of the controller.

In accordance with one or more embodiments or any of the method embodiments above, the regulator controller can include a DC regulator controller.

In accordance with one or more embodiments or any of the method embodiments above, the DC regulator controller can generate and provide a control signal to drive the AC-to-DC converter.

In accordance with one or more embodiments or any of the method embodiments above, the DC regulator controller can receive one or more feedback signals from a DC link of the controller and can manage the control signal in accordance with the one or more feedback signals.

In accordance with one or more embodiments or any of the method embodiments above, the DC voltage can be generated as constant.

In accordance with one or more embodiments or any of the method embodiments above, the controller can include an exciter drive controller that receives and utilizes one or more feedback signals from a main output of the generator to provide a pulse width modulation (PWM) control signal to the exciter drive, and the exciter drive can provide the DC current to the exciter from the DC voltage based on the PWM control signal.

In accordance with one or more embodiments or any of the method embodiments above, the AC-to-DC converter can include a boost converter, and the regulator controller can include a boost converter controller.

In accordance with one or more embodiments or any of the method embodiments above, the boost converter and the boost converter controller of the controller can convert 3-Phase PMG to a fixed high voltage for use in driving the exciter.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
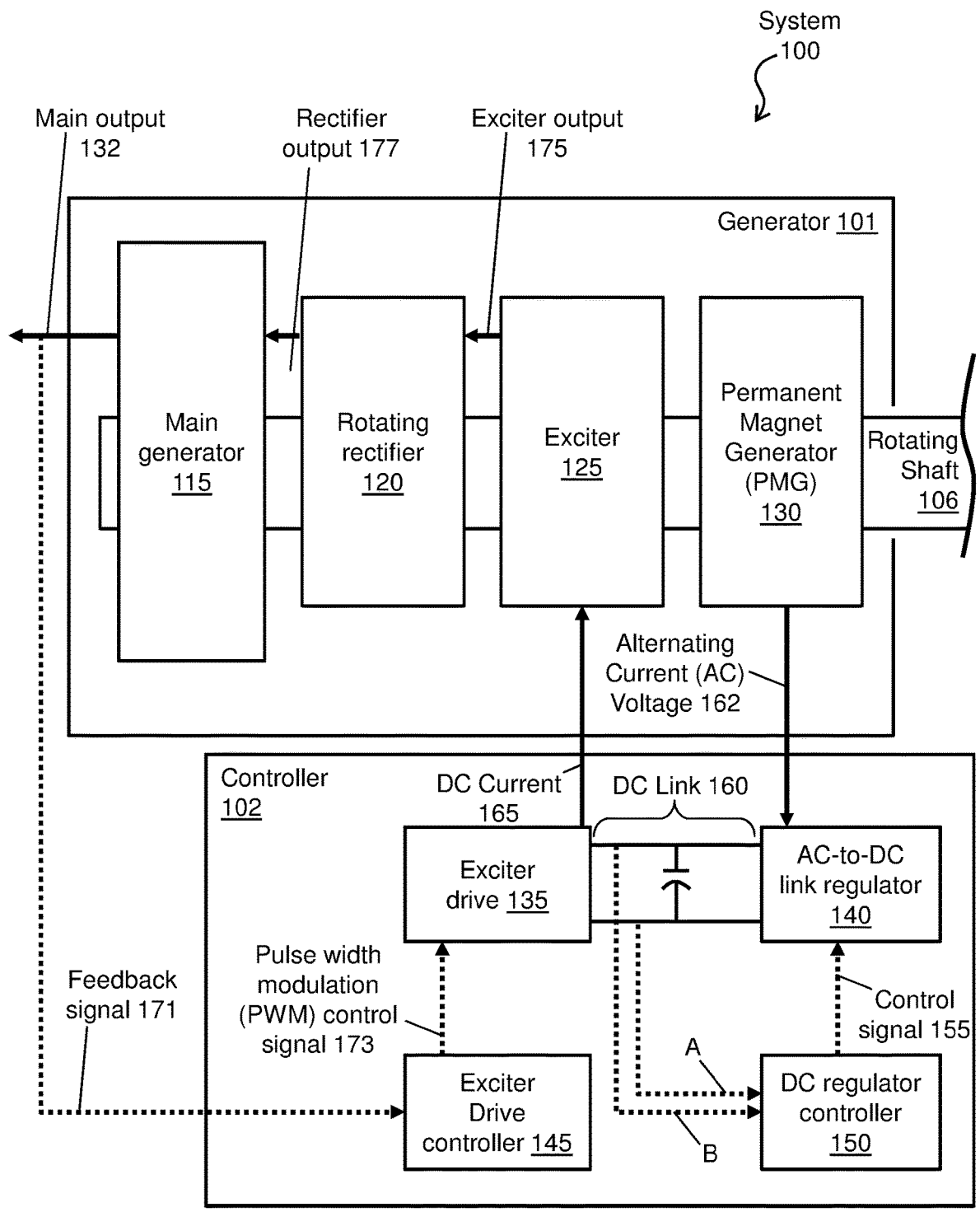
FIG. 1 is a system according to one or more embodiments.

FIG. 1 depicts a system 100 in accordance with one or more embodiments. The system 100 includes a generator 101 and a controller 102 configured with respect to a shaft 106.

The generator 101 includes a main generator 115, a rotating rectifier 120, an exciter 125, and a permanent magnet generator (PMG) 130, each of which is operatively positioned along the shaft. The generator 101 is a device that converts mechanical energy from the shaft 106 to electrical energy. An example of the generator 101 includes a 3-Phase generator.

The controller 102 includes an exciter drive 135, an AC-to-DC converter (shown as an AC-to-DC link regulator 140), an exciter drive controller 145, and a regulator controller (shown as a DC regulator controller 150). The controller 102 is an electronic device that manages the operations of the generator 101.

The exciter drive 135 provides a DC current to the exciter 125 of the generator 101 using the DC voltage created by the AC-to-DC converter (in accordance with the control signal).

The AC-to-DC converter (e.g., AC-to-DC link regulator 140) generates a DC voltage that is constant (i.e., not particularly proportional to the speed of the generator 101). Thus, even though the speed of the generator 101 is changing, the DC voltage remains constant/fixed.

In accordance with one or more embodiments, the system 100 includes topologies of active rectification and/or topologies with passive rectification and DC-to-DC conversion. For instance, the AC-to-DC converter (e.g., AC-to-DC link regulator 140 that drives the AC-to-DC conversion) can be an active rectifier or a passive rectifier followed by a DC-DC switch-mode power supply (SMPS). In the former case, the active rectifier itself provides the DC link regulation function. In the latter case, the AC-to-DC link regulator 140 can include a DC-to-DC switch-mode power supply. Examples of the DC-DC SMPS include boost converter, buck converter, buck-boost converter, etc. Further, when utilizing the boost and/or buck topologies, regulating to higher voltage and/or regulating to lower voltage provides advantages. A higher DC link voltage yields a faster response time in an output control loop of the generator 1011. A lower DC link voltage enables a lower voltage electronic component selection.

In accordance with one or more embodiments, the system 100 utilizes the controller 102, with a boost converter, a boost converter controller, and a DC-to-DC switch-mode power supply, to convert 3-Phase PMG to a fixed high voltage for use in driving the exciter 125. In accordance with one or more embodiments, the system 100 can employ a 6 pulse rectifier with a boost DC-DC converter (e.g., the boost converter) to get the fixed high voltage.

Other topology embodiments that convert PMG to fixed high voltage DC can be considered, along with topology embodiments that can sink current (e.g., pull current from the exciter 125 if needed) and have the additional benefit of inherently being capable of handling shorted rotating diode faults and improving load-off transient response. The technical effects and benefits of the system 100 include that the fixed high voltage leads lower exciter currents, better load transient responses, and a more simple high voltage power supply conversion.

Figure 2:
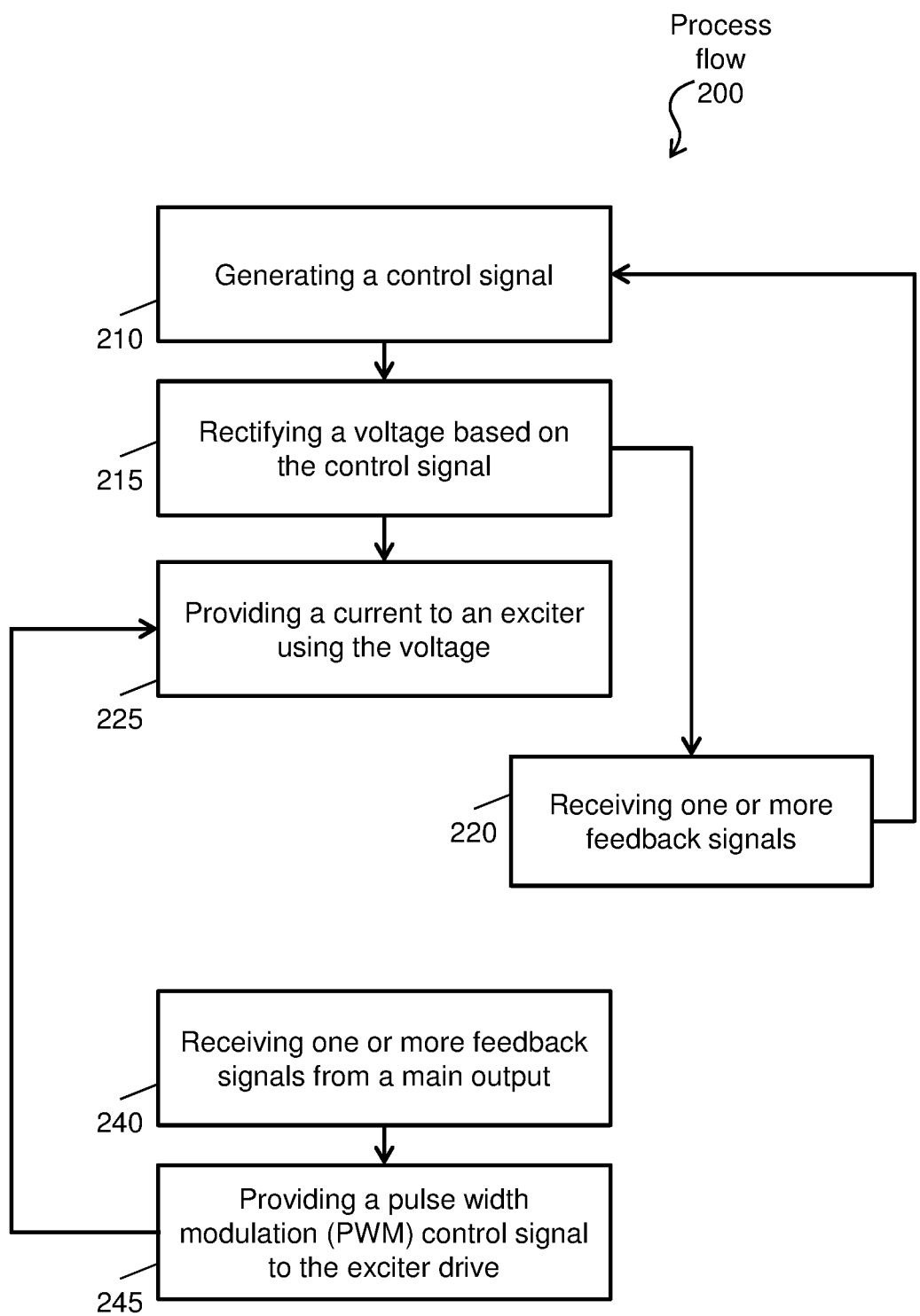
FIG. 2 is a process flow according to one or more embodiments.

For example, FIG. 2 depicts a process flow 200 as an example operation of the system 100 according to one or more embodiments. The process flow 200 begins at block 210, where a control signal 155 is generated by and provided from the DC regulator controller 150 to the AC-to-DC link regulator 140. At block 215, the control signal 155 drives the AC-to-DC link regulator 140 to convert into a fixed DC link 160 an AC voltage 162.

At block 220, the DC regulator control 150 can also receive one or more feedback signals feedback signals A and B from the DC link 160. In turn, at block 210, the DC regulator controller 150 can manage/alter/generate the control signal 155 to the AC-to-DC link regulator 140 in accordance with these feedback signals A and B.

At block 225, using this rectified AC voltage (e.g., a DC voltage), the exciter drive 135 provides a DC current 165 to the exciter 125. More particularly, the exciter drive 135 converts a DC voltage into a DC current and supplies the DC current to the exciter 125 of the generator 101.

Thus, the AC-to-DC link regulator 140 controls a voltage on the DC link 160. In accordance with one or more embodiments, the AC-to-DC link regulator 140 provides the technical advantage of controlling the voltage of the DC link 160 to a fixed value or smaller range than any diode bridge. By controlling the voltage of the DC link 160, the system 100 improves response to speed transients and/or load transients of the generator 101. Additionally, with respect to one or more embodiments, the controller 102 (e.g., via the AC-to-DC link regulator 140) allows a current to be sunk back into the PMG 130, thereby preventing transient overvoltages from occurring in the DC link 160.

At block 240, the exciter drive controller 145 can also receive a feedback signal 171 from a main output 132. At block 245, utilizing the feedback signal 171, the exciter drive controller 145 provides a pulse width modulation (PWM) control signal 173 to the exciter drive 135.

Note that the main generator 115 is a source of electricity, provided as the main output 132, within the generator 101 based on the operations of the rotating shaft 106, the rotating rectifier 120, the exciter 125, and the PMG 130. For example, the PMG 130 is used as a power source to provide excitation power to the exciter 125. The exciter 125 provides further power (e.g., an exciter output 175) to the rotating rectifier 120, which provides a rectifier output 177 to the main generator 115. In this way, the exciter output 175, the rectifier output 177, and the main output 132 are directly related to the feedback signal 171 that assists the exciter drive controller 145 with generating the PWM control signal 173.

The process flow 200 can then return to block 225, where the exciter drive 145 provides the DC current 165 to the exciter 125 from the rectified voltage on the DC link 160 based on the pulse width modulation (PWM) control signal 173.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
   a generator comprising:
   a permanent magnet generator (PMG), and
   an exciter; and
   a controller managing operations of the generator, the controller comprising:
   an alternating current to direct current (AC-to-DC) converter generating a direct current (DC) voltage,
   an exciter drive providing a DC current to the exciter using the DC voltage created by the AC-to-DC converter in accordance with the control signal, and
   a regulator controller driving the active AC-to-DC converter,
   wherein the AC-to-DC converter comprises an AC-to-DC link regulator, the AC-to-DC link regulator rectifying an AC voltage received from the permanent magnet generator (PMG) of the generator into a DC link of the controller.

2. The system of claim 1, wherein the AC-to-DC converter comprises an AC-to-DC link regulator.

3. The system of claim 2, wherein the AC-to-DC link regulator rectifies an AC voltage received from the PMG into a DC link of the controller.

4. The system of claim 1, wherein the regulator controller comprises a DC regulator controller.

5. The system of claim 4, wherein the DC regulator controller generates and provides a control signal to drive the AC-to-DC converter.

6. The system of claim 5, wherein the DC regulator controller receives one or more feedback signals from a DC link of the controller and manages the control signal in accordance with the one or more feedback signals.

7. The system of claim 1, wherein the DC voltage is generated as constant.

8. The system of claim 1, wherein the controller comprises an exciter drive controller that receives and utilizes one or more feedback signals from a main output of the generator to provide a pulse width modulation (PWM) control signal to the exciter drive, and
   wherein the exciter drive provides the DC current to the exciter from the DC voltage based on the PWM control signal.

9. The system of claim 1, wherein the AC-to-DC converter comprises a boost converter.

10. The system of claim 9, wherein the regulator controller comprises a boost converter controller.

11. The system of claim 10, wherein the boost converter and the boost converter controller of the controller convert 3-Phase PMG to a fixed high voltage for use in driving the exciter.

12. A method implemented by a controller managing operations of a generator comprising:
    generating a control signal by a regulator of the controller;
    providing the control signal by the regulator to an alternating current to direct current (AC-to-DC) converter of the controller;
    driving, by the control signal, the AC-to-DC converter to generate a direct current (DC) voltage; and
    providing a DC current to an exciter of the generator using the DC voltage created by the AC-to-DC converter in accordance with the control signal,
    wherein the AC-to-DC converter comprises an AC-to-DC link regulator, the AC-to-DC link regulator rectifying an AC voltage received from a permanent magnet generator (PMG) of the generator into a DC link of the controller.

13. The method of claim 12, wherein the regulator controller comprises a DC regulator controller.

14. The method of claim 13, wherein the DC regulator controller generates and provides a control signal to drive the AC-to-DC converter.

15. The method of claim 14, wherein the DC regulator controller receives one or more feedback signals from a DC link of the controller and manages the control signal in accordance with the one or more feedback signals.

16. The method of claim 12, wherein the DC voltage is generated as constant.

17. The method of claim 12, wherein the controller comprises an exciter drive controller that receives and utilizes one or more feedback signals from a main output of the generator to provide a pulse width modulation (PWM) control signal to the exciter drive, and
    wherein the exciter drive provides the DC current to the exciter from the DC voltage based on the PWM control signal.

18. The method of claim 12, wherein the AC-to-DC converter comprises a boost converter, and wherein the regulator controller comprises a boost converter controller.

19. The method of claim 18, wherein the boost converter and the boost converter controller of the controller convert 3-Phase PMG to a fixed high voltage for use in driving the exciter.

20. A method implemented by a controller managing operations of a generator comprising:
    generating a control signal by a regulator of the controller;

providing the control signal by the regulator to an alternating current to direct current (AC-to-DC) converter of the controller;

driving, by the control signal, the AC-to-DC converter to generate a direct current (DC) voltage; and providing a DC current to an exciter of the generator using the DC voltage created by the AC-to-DC converter in accordance with the control signal, wherein the regulator controller comprises a DC regulator controller.

* * * * *